United States Patent
Lee et al.

(10) Patent No.: US 10,012,842 B2
(45) Date of Patent: Jul. 3, 2018

(54) STEREOSCOPIC IMAGE DISPLAY AND METHOD FOR MANUFACTURING THE SAME

(71) Applicant: LG Display Co., Ltd., Seoul (KR)

(72) Inventors: Donghoon Lee, Gyeonggi-do (KR); Sungpil Ryu, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 204 days.

(21) Appl. No.: 15/085,502

(22) Filed: Mar. 30, 2016

(65) Prior Publication Data
US 2016/0209667 A1 Jul. 21, 2016

Related U.S. Application Data

(62) Division of application No. 14/025,982, filed on Sep. 13, 2013, now Pat. No. 9,335,554.

(30) Foreign Application Priority Data

Nov. 30, 2012 (KR) .......................... 10-2012-0138004

(51) Int. Cl.
G02B 27/26 (2006.01)
B29C 65/48 (2006.01)
G02B 27/22 (2018.01)

(52) U.S. Cl.
CPC .............. *G02B 27/26* (2013.01); *B29C 65/48* (2013.01); *G02B 27/22* (2013.01); *G02B 27/225* (2013.01); *G02B 27/2214* (2013.01); *G02B 27/2242* (2013.01); *Y10T 29/49002* (2015.01)

(58) Field of Classification Search
None
See application file for complete search history.

(56) References Cited

U.S. PATENT DOCUMENTS

| | | |
|---|---|---|
| 7,414,594 B2 | 8/2008 | Kim |
| 7,686,463 B2 | 3/2010 | Goto |
| 7,697,204 B2 | 4/2010 | Sugiyama |

(Continued)

FOREIGN PATENT DOCUMENTS

| | | |
|---|---|---|
| CN | 102279484 A | 12/2011 |
| TW | 200827953 A | 7/2008 |

OTHER PUBLICATIONS

First Notification of Office Action dated Jul. 20, 2015 from the State Intellectual Property Office of China in counterpart Chinese application No. 201310280868.7 (with partial translation).

(Continued)

*Primary Examiner* — Lisa L Herring
(74) *Attorney, Agent, or Firm* — Morgan, Lewis & Bockius LLP

(57) ABSTRACT

A stereoscopic image display and a method for manufacturing the same are disclosed. The stereoscopic image display includes a display panel, a polarizing plate positioned on a display surface of the display panel, a patterned retarder film positioned on the polarizing plate, and a pattern layer positioned between the display surface of the display panel and the polarizing plate. The pattern layer has a pattern groove provided with an air layer therein. The pattern groove has a wide lower part contacting the display surface of the display panel and a narrow upper part contacting the polarizing plate.

8 Claims, 10 Drawing Sheets

(56) References Cited

U.S. PATENT DOCUMENTS

| | | |
|---|---|---|
| 7,942,541 B2 | 5/2011 | Kang |
| 2004/0223094 A1* | 11/2004 | Hamada ............... G02B 6/0051 349/63 |
| 2005/0288469 A1* | 12/2005 | Higuchi ............... B29C 39/006 526/319 |
| 2006/0093793 A1* | 5/2006 | Miyakawa ......... B29D 11/0073 428/172 |
| 2008/0100913 A1* | 5/2008 | Hwang ................. G02B 5/305 359/487.05 |
| 2008/0239484 A1 | 10/2008 | Fukaishi |
| 2009/0273834 A1 | 11/2009 | Korenaga |
| 2010/0073604 A1 | 3/2010 | Okuyama |
| 2011/0080723 A1 | 4/2011 | Kaluzhny |
| 2011/0298792 A1 | 12/2011 | Lim |
| 2012/0250353 A1* | 10/2012 | Sakamoto ............ G02B 6/0036 362/612 |
| 2013/0100258 A1 | 4/2013 | Kim |
| 2015/0036209 A1 | 2/2015 | Ichihashi |

OTHER PUBLICATIONS

Office Action dated Jul. 5, 2016 from the Taiwan Advance Patent & Trademark Office in counterpart Taiwanese application No. 102130364.

* cited by examiner (a)

(b)

(c)

(a)

(b)

(c)

(d)

STEREOSCOPIC IMAGE DISPLAY AND METHOD FOR MANUFACTURING THE SAME

This application is a divisional application of copending U.S. application Ser. No. 14/025,982, filed on Sep. 13, 2013, which claims the benefit of priority of Korean Patent Application No. 10-2012-0138004, filed on Nov. 30, 2012, both of which are hereby incorporated by reference, in their entirety.

BACKGROUND OF THE INVENTION

Field of the Invention

Embodiments of the invention relate to a stereoscopic image display and a method for manufacturing the same.

Discussion of the Related Art

Examples of a method for implementing a stereoscopic image display include a stereoscopic technique and an autostereoscopic technique.

The stereoscopic technique, which uses a parallax image between left and right eyes of a user with a high stereoscopic effect, includes a glasses type method and a non-glasses type method, both of which have been put to practical use. In the glasses type method, left and right eye images each having a different polarization direction are displayed on a direct-view liquid crystal display panel or a projector in a time-division manner, and a stereoscopic image is implemented using polarized glasses or liquid crystal shutter glasses. In the non-glasses type method, an optical plate such as a parallax barrier for separating an optical axis of the parallax image between the left and right eyes is generally installed in front of or behind a display screen.

A patterned retarder film alternately mixes the left eye image and the right eye image, thereby displaying the stereoscopic image in an interlace manner. For this, light passing through odd-numbered lines of the patterned retarder film is converted into right circularly polarized light, and light passing through even-numbered lines of the patterned retarder film is converted into left circularly polarized light. Hence, the patterned retarder film separates the image displayed on the display panel into the left eye image and the right eye image.

A black stripe is formed between the odd-numbered line and the even-numbered line of the related art patterned retarder film to increase a vertical viewing angle. However, the black stripe results in a reduction in a transmittance when a two-dimensional (2D) image is displayed. Hence, a luminance of the stereoscopic image display is reduced. Accordingly, the improvement of the black stripe is required.

SUMMARY OF THE INVENTION

In one aspect, there is a stereoscopic image display including a display panel, a polarizing plate positioned on a display surface of the display panel, a patterned retarder film positioned on the polarizing plate, and a pattern layer positioned between the display surface of the display panel and the polarizing plate, the pattern layer having a pattern groove provided with an air layer therein, wherein the pattern groove has a wide lower part contacting the display surface of the display panel and a narrow upper part contacting the polarizing plate.

In another aspect, there is a method for manufacturing a stereoscopic image display including forming a display panel, forming a three-dimensional (3D) film including a patterned retarder film, a polarizing plate, and a pattern layer, positioning a mold having an embossment including a plurality of peaks and valleys on the pattern layer, closely positioning the mold on the pattern layer, so that the plurality of peaks and valleys are formed on the pattern layer in the form of an intaglio, removing the mold and forming an adhesive on the pattern layer so that the pattern layer has a pattern groove provided with an air layer inside the intaglio, and positioning the adhesive so that it is opposite to a display surface of the display panel, and attaching the 3D film to the display surface of the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described with reference to FIGS. 1 to 16.

First Embodiment

Figure 1:
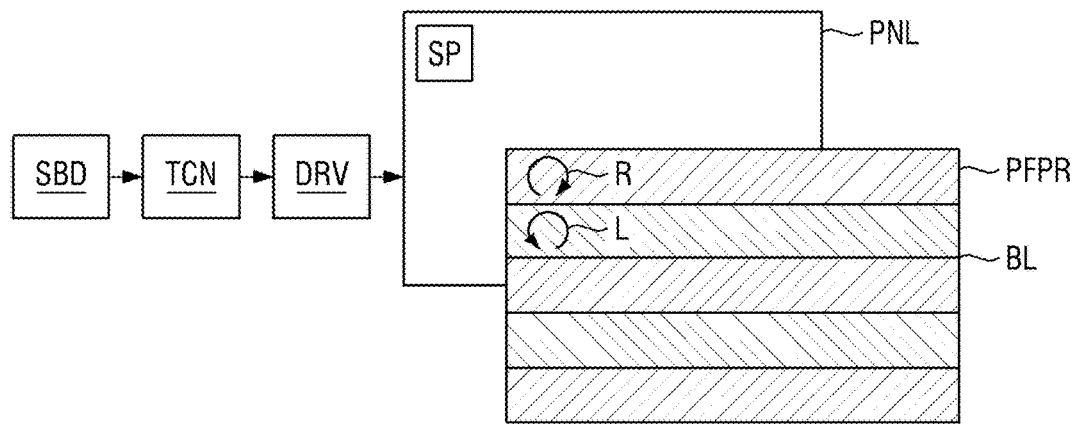
FIG. 1 schematically illustrates a configuration of a stereoscopic image display according to an exemplary embodiment of the invention.
Figure 2:
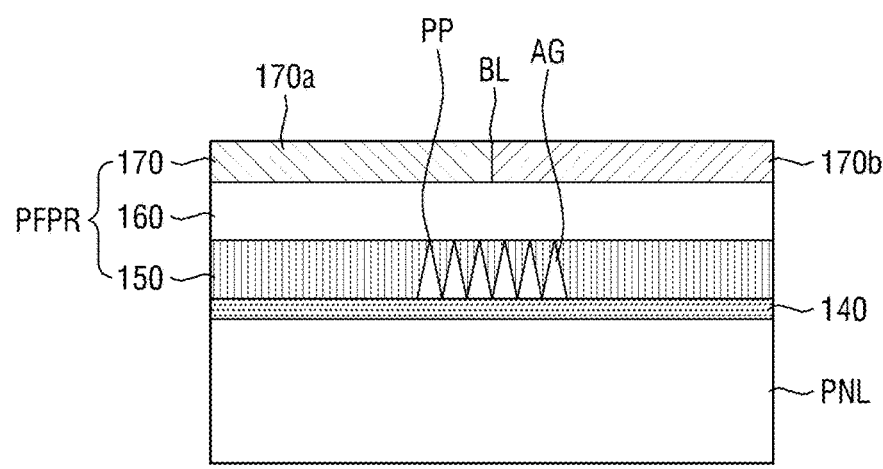
FIG. 2 is a cross-sectional view of a display panel and a three-dimensional (3D) film according to a first embodiment of the invention.

FIG. 1 schematically illustrates a configuration of a stereoscopic image display according to an exemplary embodiment of the invention. FIG. 2 is a cross-sectional view of a display panel and a three-dimensional (3D) film according to a first embodiment of the invention.

As shown in FIG. 1, a stereoscopic image display according to the first embodiment of the invention includes an image supply unit SBD, a timing controller TCN, a driver DRV, a display panel PNL, a 3D film PFPR, and polarized glasses GLS.

The image supply unit SBD produces two-dimensional (2D) image frame data in a 2D mode and produces 3D image frame data in a 3D mode. The image supply unit SBD supplies timing signals, such as a vertical sync signal Vsync, a horizontal sync signal Hsync, a data enable signal DE, and a main clock, and the 2D and 3D image frame data to the timing controller TCN.

The image supply unit SBD selects the 2D or 3D mode based on a user selection received through a user interface and produces the 2D or 3D image frame data corresponding to the selected 2D or 3D mode. The image supply unit SBD supplies the 2D or 3D image frame data to the timing controller TCN. The user interface includes a user input device such as an on-screen display (OSD), a remote controller, a keyboard, and a mouse. Hereinafter, the embodiment of the invention describes that the image supply unit SBD selects the 3D mode and supplies the 3D image frame data to the timing controller TCN as an example.

The timing controller TCN receives 3D image frame data including left eye image frame data and right eye image frame data from the image supply unit SBD. The timing controller TCN alternately supplies the left eye image frame data and the right eye image frame data to the driver DRV at a frame frequency equal to or greater than about 120 Hz. Further, the timing controller TCN supplies a control signal corresponding to the image frame data to the driver DRV.

The driver DRV includes a data driver, which is connected to data lines and supplies a data signal to the data lines, and a gate driver which is connected to gate lines and supplies a gate signal to the gate lines. The data driver of the driver DRV converts digital type left and right eye image frame data into analog type left and right eye image frame data under the control of the timing controller TCN and supplies the analog type left and right eye image frame data to the data lines. The gate driver of the driver DRV sequentially supplies the gate signal to the gate lines under the control of the timing controller TCN.

The display panel PNL receives the gate signal and the data signal from the driver DRV and displays a 2D image or a 3D image corresponding to the gate signal and the data signal. The display panel PNL includes subpixels SP. The subpixels SP of the display panel PNL are driven so that they autonomously produce light corresponding to the gate signal and the data signal supplied from the driver DRV or transmit light provided from the outside. The display panel PNL may be variously implemented as a liquid crystal display panel, an organic light emitting display panel, or a plasma display panel, etc. based on the structure of the subpixels SP.

As shown in FIG. 2, the 3D film PFPR separates the 3D image displayed on the display panel PNL into a left eye image and a right eye image and is attached to a display surface of the display panel PNL. The 3D film PFPR includes an adhesive 140, a pattern layer 150, a polarizing plate 160, and a patterned retarder film 170. The adhesive 140, the pattern layer 150, the polarizing plate 160, and the patterned retarder film 170 are sequentially positioned on the display surface of the display panel PNL in the order named. The adhesive 140, the pattern layer 150, the polarizing plate 160, and the patterned retarder film 170 of the 3D film PFPR form an integral body and are attached to the display surface of the display panel PNL. Alternatively, they may be individually formed.

The patterned retarder film 170 alternately displays the left eye images and the right eye images on the display panel PNL and thus displays the 3D image in an interlace manner. The patterned retarder film 170 includes retarder pattern layers 170a and 170b and a pattern separator BL. The first and second retarder pattern layers 170a and 170b generate right circular polarization R and left circular polarization L. The pattern separator BL is a boundary line for separating the first and second retarder pattern layers 170a and 170b. The first and second retarder pattern layers 170a and 170b are alternately positioned along a horizontal direction of the display panel PNL on a per line basis. Hence, the left eye image and the right eye image displayed on the display panel PNL are separated by the retarder pattern layers 170a and 170b of the patterned retarder film 170 on a per line basis.

The pattern layer 150 has a pattern groove PP provided with an air layer AG therein. The pattern layer 150 totally reflects and/or diffusely reflects light passing through a corresponding area using a difference between refractive indexes of the air layer AG formed inside the pattern groove PP and a medium forming the pattern layer 150, and disperses the light. A lower part of the pattern groove PP contacting the display surface of the display panel PNL is widely formed, and an upper part of the pattern groove PP contacting the polarizing plate 160 is narrowly formed. The pattern groove PP includes a plurality of peaks and valleys and thus provides the air layer AG. The plurality of peaks and valleys may have straight lines or nonlinear lines. The pattern groove PP has a triangular cross section, and three sides of the triangular pattern groove PP may have the same length. Alternatively, a length of one of the three sides may be different from lengths of the other two sides. Namely, the shape of the pattern groove PP may be a regular triangle, an isosceles triangle, or a right-angled triangle.

The polarized glasses GLS separates the image emitted through the 3D film PFPR into the left eye image and the right eye image. A left lens LEFT of the polarized glasses GLS transmits only a left eye image LIMG emitted through the 3D film PFPR. On the other hand, a right lens RIGHT of the polarized glasses GLS transmits only a right eye image RLIMG emitted through the 3D film PFPR.

According to the above-described structure of the stereoscopic image display, when the left eye image and the right eye image are alternately displayed on the display panel PNL on a per frame basis, the 3D film PFPR separates the left eye image and the right eye image and emits them. Hence, a user may feel a 3D stereoscopic image using the polarized glasses GLS.

Hereinafter, exemplary embodiments of the invention are described based on the structure of the stereoscopic image display illustrated in FIG. 1.

Second Embodiment

Figure 3:
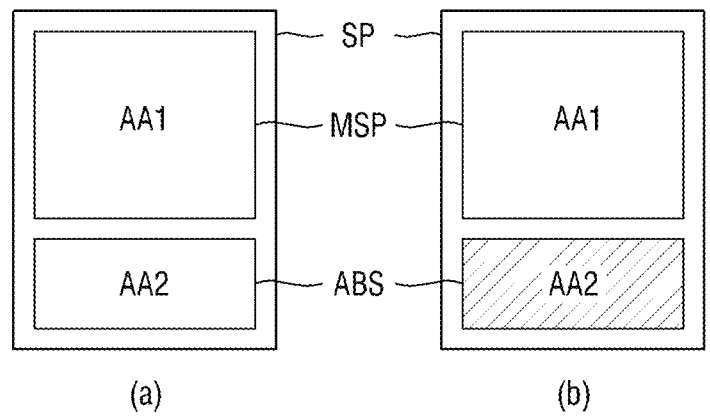
FIG. 3 is a plane view of a structure of a subpixel applicable to a second embodiment of the invention.
Figure 4:
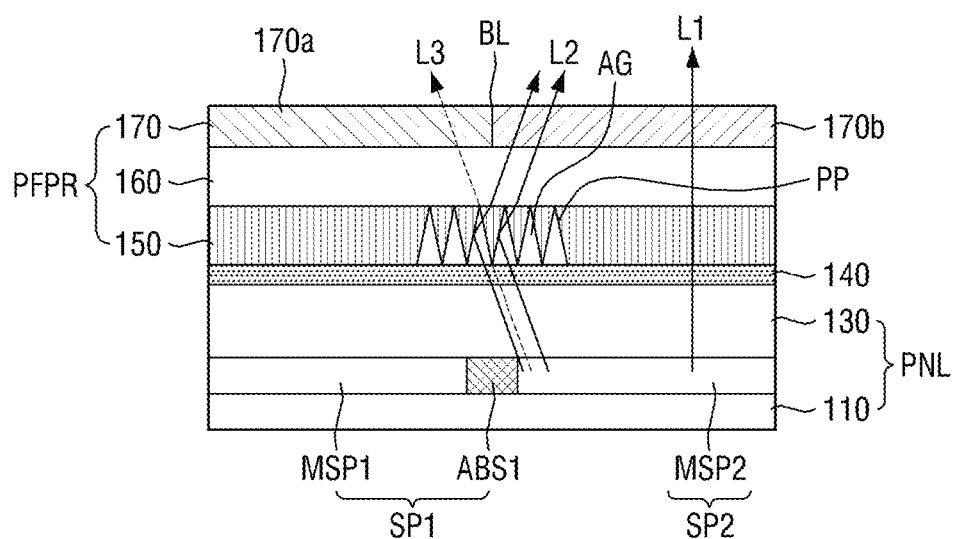
FIG. 4 is a cross-sectional view of a display panel and a 3D film according to the second embodiment of the invention.

FIG. 3 is a plane view of a structure of a subpixel applicable to a second embodiment of the invention. FIG. 4 is a cross-sectional view of a display panel and a 3D film according to the second embodiment of the invention.

A subpixel SP applicable to the second embodiment of the invention includes a main subpixel MSP and an active black stripe ABS having an area less than the main subpixel MSP. When each subpixel SP of a display panel PNL has the above-described structure, the main subpixel MSP and the active black stripe ABS operate as follows.

As shown in (a) of FIG. 3, when the display panel PNL is driven in the 2D mode, the main subpixel MSP and the active black stripe ABS are driven in the same manner so as to display the 2D image. More specifically, a first active area AA1 of the main subpixel MSP and a second active area AA2 of the active black stripe ABS display an effective image.

On the other hand, as shown in (b) of FIG. 3, when the display panel PNL is driven in the 3D mode, the main subpixel MSP is driven so as to display the 3D image, but the active black stripe ABS is driven so as to display a black image. More specifically, the first active area AA1 of the main subpixel MSP displays an effective image, and the second active area AA2 of the active black stripe ABS displays a non-effective image, for example, a black image. As described above, when the display panel PNL is driven in the 3D mode, the active black stripe ABS prevents mixture of the images.

The display panel PNL, which is driven in above-described manner, may be implemented as a liquid crystal display panel, for example. The liquid crystal display panel includes a lower substrate 110 on which thin film transistors and capacitors, etc. are formed, and an upper substrate 130 on which color filters, etc. are formed. The liquid crystal display panel may be implemented in any liquid crystal mode including a twisted nematic (TN) mode, a vertical alignment (VA) mode, an in-plane switching (IPS) mode, and a fringe field switching (FFS) mode. Other liquid crystal modes may be used. The liquid crystal display panel may display the image using light provided by a backlight unit.

Even when the display panel PNL is configured as described above, configuration of a 3D film PFPR according to the second embodiment may be substantially the same as the first embodiment. A position relationship between the display panel PNL and a structure constituting a pattern layer 150 and a patterned retarder film 170 of the 3D film PFPR is described below.

First and second retarder pattern layers 170a and 170b of the patterned retarder film 170 are disposed at positions corresponding to a first main subpixel MSP1 and a second main subpixel MSP2, respectively. A pattern separator BL of the patterned retarder film 170 is disposed at a position corresponding to a first active black stripe ABS1. A pattern groove PP of the pattern layer 150 is disposed at a position corresponding to the pattern separator BL and the first active black stripe ABS1. A first subpixel SP1 is positioned on a first gate line, and a second subpixel SP2 is positioned on a second gate line. Namely, the first subpixel SP1 and the second subpixel SP2 are positioned on the upper and lower sides of the display panel PNL.

The pattern layer 150 has the pattern groove PP which includes a plurality of peaks and valleys and is provided with an air layer AG therein. A refractive index of the upper substrate 130, which is generally formed of glass, is about 1.5; a refractive index of the air layer AG is 1.0; and a refractive index of a polarizing plate 160 is about 1.3 to 1.4. Light approaching the pattern groove PP provided with the air layer AG is totally reflected and/or diffusely reflected, because the shape of the pattern groove PP controls an angle of the light and also there is a difference between the refractive indexes of the upper substrate 130, the air layer AG, and the polarizing plate 160.

Accordingly, when the pattern groove PP provided with the air layer AG is disposed at the position corresponding to the pattern separator BL and the first active black stripe ABS1, light generating a crosstalk is refracted. Hence, a straight light L1 passing through the second main subpixel MSP2 in a straight line and first and second oblique lights L2 and L3 traveling from the second main subpixel MSP2 to the pattern groove PP corresponding to the first active black stripe ABS1 adjacent to the second main subpixel MSP2 in an oblique line are refracted as shown in FIG. 4. As a result, when the display panel PNL is driven in the 3D mode, a vertical viewing angle of the stereoscopic image display may be improved. Further, an amount of light leaking by the crosstalk may be minimized by forming the pattern groove PP in a prism shape and modifying the peaks of the pattern groove PP more sharply.

Third Embodiment

Figure 5:
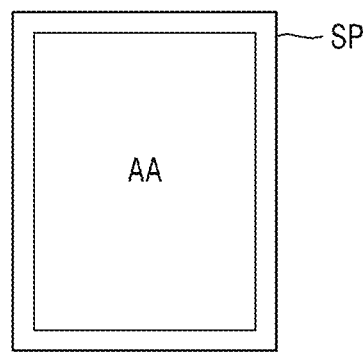
FIG. 5 is a plane view of a structure of a subpixel applicable to a third embodiment of the invention.
Figure 6:
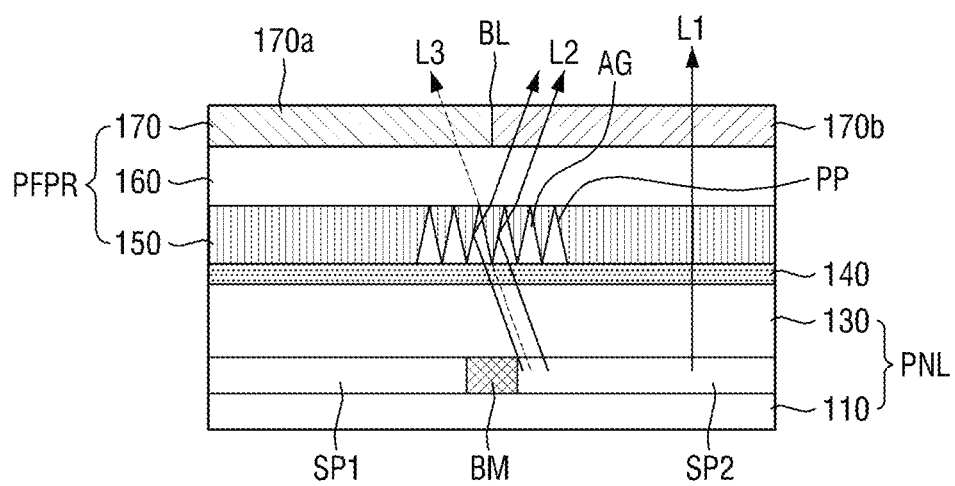
FIG. 6 is a cross-sectional view of a display panel and a 3D film according to the third embodiment of the invention.

FIG. 5 is a plane view of a structure of a subpixel applicable to a third embodiment of the invention. FIG. 6 is a cross-sectional view of a display panel and a 3D film according to the third embodiment of the invention.

A subpixel SP applicable to the third embodiment of the invention includes one active area AA. In the third embodiment of the invention, a black matrix BM may replace an active black stripe. The black matrix BM is formed inside an upper substrate 130 and has a stripe shape between first and second subpixels SP1 and SP2.

Even when a display panel PNL is configured as described above, configuration of a 3D film PFPR according to the third embodiment may be substantially the same as the first embodiment. A position relationship between the display panel PNL and a structure constituting a pattern layer 150 and a patterned retarder film 170 of the 3D film PFPR is described below.

First and second retarder pattern layers 170a and 170b of the patterned retarder film 170 are disposed at positions corresponding to the first subpixel SP1 and the second subpixel SP2, respectively. A pattern separator BL of the patterned retarder film 170 is disposed at a position corresponding to a black matrix BM. A pattern groove PP of the pattern layer 150 is disposed at a position corresponding to the pattern separator BL and the black matrix BM.

The pattern layer 150 has the pattern groove PP which includes a plurality of peaks and valleys and is provided with an air layer AG therein. A refractive index of the upper substrate 130, which is generally formed of glass, is about 1.5; a refractive index of the air layer AG is 1.0; and a refractive index of a polarizing plate 160 is about 1.3 to 1.4. Light approaching the pattern groove PP provided with the air layer AG is totally reflected and/or diffusely reflected, because the shape of the pattern groove PP controls an angle of the light and also there is a difference between the refractive indexes of the upper substrate 130, the air layer AG, and the polarizing plate 160.

Accordingly, when the pattern groove PP provided with the air layer AG is disposed at the position corresponding to the pattern separator BL and the black matrix BM, light generating a crosstalk is refracted. Hence, a straight light L1 passing through the second subpixel SP2 in a straight line and first and second oblique lights L2 and L3 traveling from the second subpixel SP2 to the pattern groove PP corresponding to the black matrix BM adjacent to the second subpixel SP2 in an oblique line are refracted as shown in FIG. 6. As a result, when the display panel PNL is driven in the 3D mode, a vertical viewing angle of the stereoscopic image display may be improved. Further, an amount of light leaking by the crosstalk may be minimized by forming the pattern groove PP in a prism shape and modifying the peaks of the pattern groove PP more sharply.

Fourth Embodiment

Figure 7:
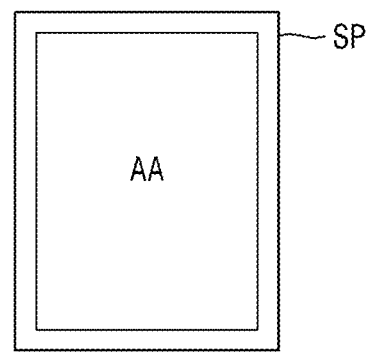
FIG. 7 is a plane view of a structure of a subpixel applicable to a fourth embodiment of the invention.
Figure 8:
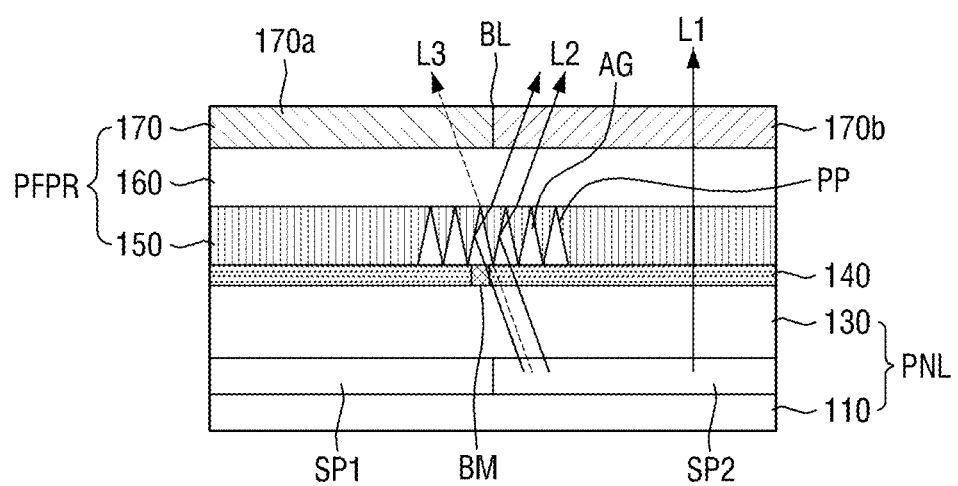
FIG. 8 is a cross-sectional view of a display panel and a 3D film according to the fourth embodiment of the invention.

FIG. 7 is a plane view of a structure of a subpixel applicable to a fourth embodiment of the invention. FIG. 8 is a cross-sectional view of a display panel and a 3D film according to the fourth embodiment of the invention.

A subpixel SP applicable to the fourth embodiment of the invention includes one active area AA. In the fourth embodiment of the invention, a black matrix BM may replace an active black stripe. The black matrix BM is formed on an upper substrate 130 and has a stripe shape between first and second subpixels SP1 and SP2.

Even when a display panel PNL is configured as described above, configuration of a 3D film PFPR according to the fourth embodiment may be substantially the same as the first embodiment. A position relationship between the display panel PNL and a structure constituting a pattern layer 150 and a patterned retarder film 170 of the 3D film PFPR is described below.

First and second retarder pattern layers 170a and 170b of the patterned retarder film 170 are disposed at positions corresponding to the first subpixel SP1 and the second subpixel SP2, respectively. A pattern separator BL of the patterned retarder film 170 is disposed at a position corresponding to a black matrix BM. A pattern groove PP of the pattern layer 150 is disposed at a position corresponding to the pattern separator BL and the black matrix BM.

The pattern layer 150 has the pattern groove PP which includes a plurality of peaks and valleys and is provided with an air layer AG therein. A refractive index of the upper substrate 130, which is generally formed of glass, is about 1.5; a refractive index of the air layer AG is 1.0; and a refractive index of a polarizing plate 160 is about 1.3 to 1.4. Light approaching the pattern groove PP provided with the air layer AG is totally reflected and/or diffusely reflected, because the shape of the pattern groove PP controls an angle of the light and also there is a difference between the refractive indexes of the upper substrate 130, the air layer AG, and the polarizing plate 160.

Accordingly, when the pattern groove PP provided with the air layer AG is disposed at the position corresponding to the pattern separator BL and the black matrix BM, light generating a crosstalk is refracted. Hence, a straight light L1 passing through the second subpixel SP2 in a straight line and first and second oblique lights L2 and L3 traveling from the second subpixel SP2 to the pattern groove PP corresponding to the black matrix BM adjacent to the second subpixel SP2 in an oblique line are refracted as shown in FIG. 8. As a result, when the display panel PNL is driven in the 3D mode, a vertical viewing angle of the stereoscopic image display may be improved. Further, an amount of light leaking by the crosstalk may be minimized by forming the pattern groove PP in a prism shape and modifying the peaks of the pattern groove PP more sharply.

A method for manufacturing a stereoscopic image display according to a fifth embodiment of the invention is described below. Since the manufacturing method is characterized in a method for manufacturing the 3D film, description of other components except the 3D film description may be briefly made or may be entirely omitted because the other components were described based on FIG. 1.

Figure 9:
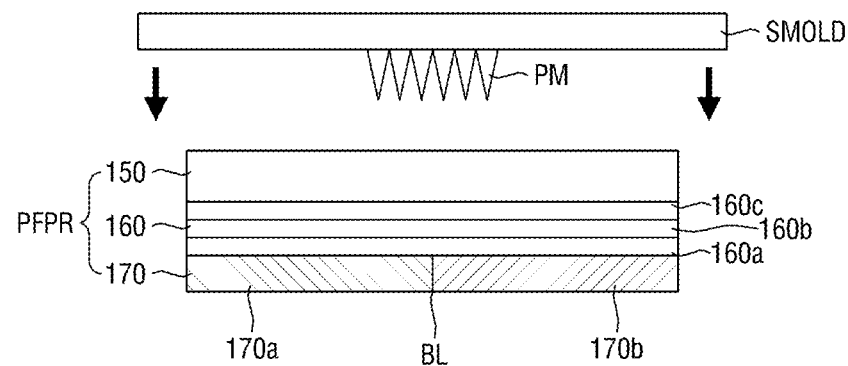
FIG. 9 is a flow chart of a process for manufacturing a 3D film according to a fifth embodiment of the invention.
Figure 9:
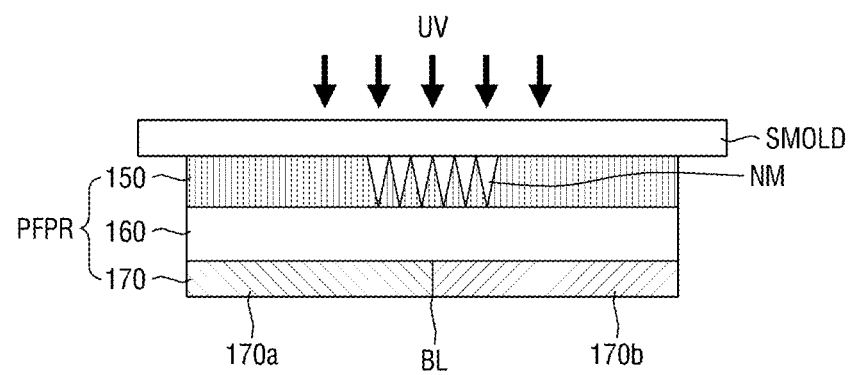
Figure 9:
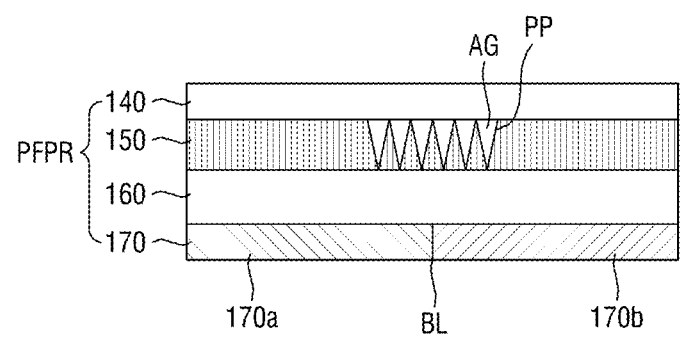

FIG. 9 is a flow diagram of a process for manufacturing a 3D film according to a fifth embodiment of the invention.

First, a display panel PNL is formed. The display panel PNL includes subpixels SP having the structure shown in FIGS. 3, 5, and 7.

Next, as shown in (a) of FIG. 9, a 3D film PFPR including a pattern layer 150, a polarizing plate 160, and a patterned retarder film 170 is formed. The patterned retarder film 170, the polarizing plate 160, and the pattern layer 150 of the 3D film PFPR are sequentially formed in the order named. The polarizing plate 160 may include a first film layer 160a, a second film layer 160b, and a third film layer 160c. The first and third film layers 160a and 160c may be selected as triacetate cellulose, and the second film layer 160b may be selected as polyvinyl alcohol. The pattern layer 150 is formed on the third film layer 160c through a coating method, etc.

Next, as shown in (a) of FIG. 9, a mold SMOLD having an embossment PM including a plurality of peaks and valleys is positioned on the pattern layer 150. The pattern layer 150 may have various shapes depending on a shape of the embossment PM of the mold SMOLD. The embossment PM of the mold SMOLD corresponds to a pattern separator BL. The embossment PM of the mold SMOLD is positioned in a horizontal direction in the same manner as the pattern separator BL. The embossment PM of the mold SMOLD has a pitch similar to or corresponding to a pitch of the subpixel SP.

Next, as shown in (b) of FIG. 9, the mold SMOLD is closely positioned on the pattern layer 150, so that the plurality of peaks and valleys are formed on the pattern layer 150 in the form of an intaglio NM. The pattern layer 150 may be formed of a resin-based material. In this instance, the mold SMOLD may be selected as a soft mold. After the soft mold is closely positioned on the pattern layer 150, ultraviolet light UV is irradiated onto the soft mold to harden the pattern layer 150. In this instance, the mold SMOLD may be pressed, and at the same time, the ultraviolet light UV may be irradiated onto the mold SMOLD. Alternatively, the mold SMOLD may be removed, and then the ultraviolet light UV may be irradiated onto the pattern layer 150.

Next, as shown in (c) of FIG. 9, the mold SMOLD is removed, and then an adhesive 140 is formed on the pattern layer 150 so that the pattern layer 150 has a pattern groove PP provided with an air layer AG inside the intaglio NM. The adhesive 140 may be formed of a material with high transparency and high transmittance. For example, the adhesive 140 may be formed of pressure sensitive adhesive (PSA) or optical clear adhesive (OCA). Other materials may be used.

Next, the adhesive 140 is positioned opposite a display surface of the display panel PNL, and then the 3D film PFPR is attached to the display surface of the display panel PNL using the adhesive 140.

Various shapes of the pattern groove PP included in the pattern layer 150 are described below.

Figure 10:
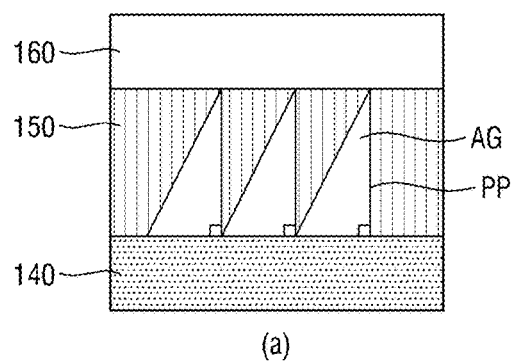
FIG. 10 illustrates various shapes of a pattern groove.
Figure 10:
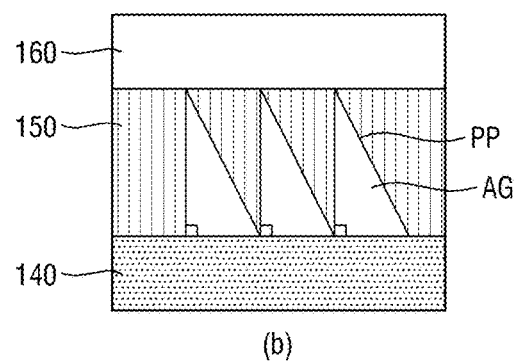
Figure 10:
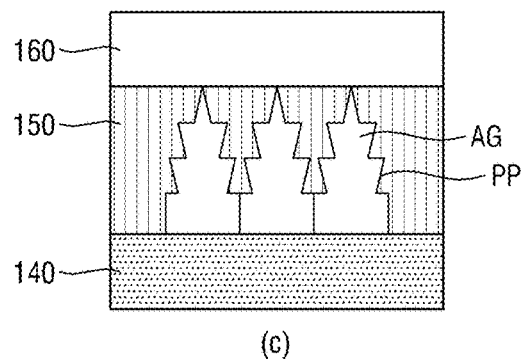
Figure 10:
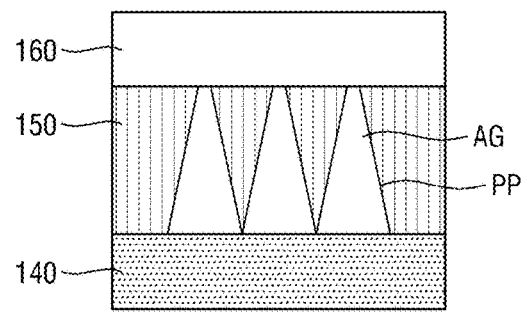

FIG. 10 illustrates various shapes of the pattern groove.

As shown in (a) of FIG. 10, the pattern groove PP includes a wide lower part contacting the adhesive 140 and a narrow upper part contacting the polarizing plate 160 and thus has a triangular shape. The pattern groove PP has the air layer AG therein. The lower part of the pattern groove PP contacting the adhesive 140 and the right side of the pattern groove PP form a right angle, and thus the shape of the pattern groove PP is a right-angled triangle.

As shown in (b) of FIG. 10, the pattern groove PP includes a wide lower part contacting the adhesive 140 and a narrow upper part contacting the polarizing plate 160 and thus has a triangular shape. The pattern groove PP has the air layer AG therein. The lower part of the pattern groove PP contacting the adhesive 140 and the left side of the pattern groove PP form a right angle, and thus the shape of the pattern groove PP is a right-angled triangle.

As shown in (c) of FIG. 10, the pattern groove PP includes a wide lower part contacting the adhesive 140 and a narrow upper part contacting the polarizing plate 160 and thus has almost a triangular shape. The pattern groove PP has the air layer AG therein. The lower part of the pattern groove PP contacting the adhesive 140 is a straight line, and the left and right sides of the pattern groove PP are nonlinear lines. Hence, the pattern groove PP has almost the triangular shape.

As shown in (d) of FIG. 10, the pattern groove PP includes a wide lower part contacting the adhesive 140 and a narrow upper part contacting the polarizing plate 160 and thus has a trapezoid shape. The pattern groove PP has the air layer AG therein.

Figure 11:
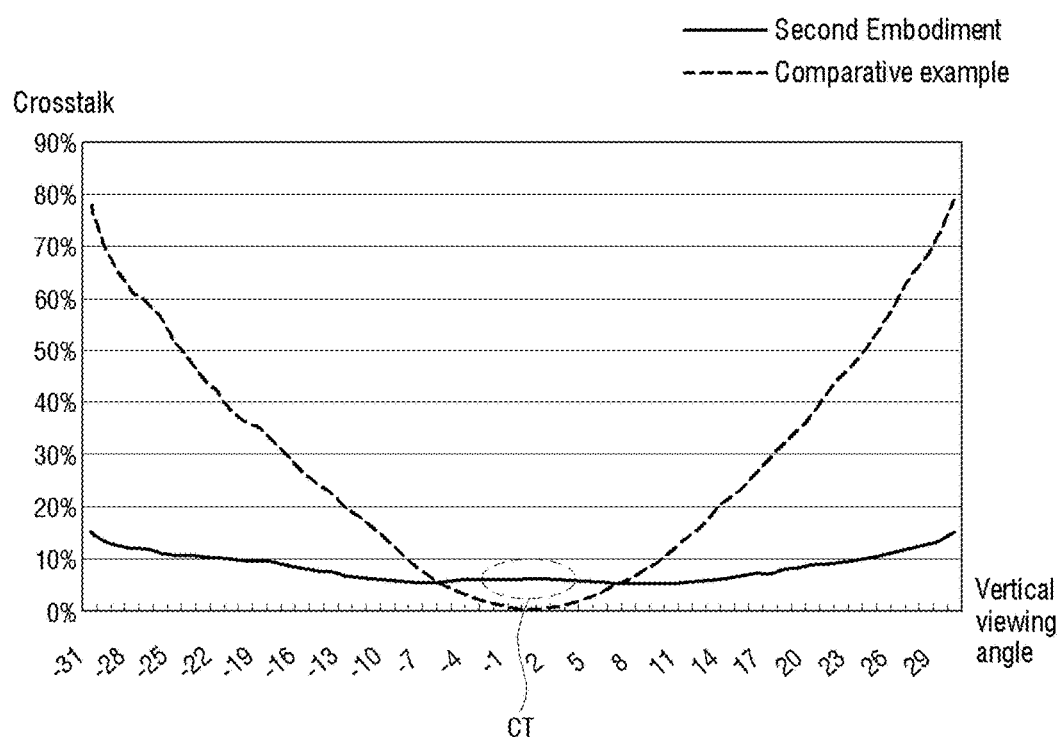
FIG. 11 is a simulation graph of the second embodiment of the invention and a comparative example.

FIG. 11 is a simulation graph of the second embodiment of the invention and a comparative example.

The comparative example of FIG. 11 has a structure in which a related art patterned retarder film is attached to a display panel having an active black stripe. The comparative example and the second embodiment of the invention used a 47-inch TV panel as the display panel. In the comparative example and the second embodiment, a 0.5T glass substrate was used as an upper substrate and a lower substrate of the display panel, and a polarizing plate attached to a display surface of the display panel had a thickness of about 180 μm. In the second embodiment of the invention, an angle of the peak of the pattern groove included in the 3D film was set to about 38°, and a length of the base of the pattern groove was set to about 46 μm.

In the comparative example, a vertical viewing angle was ±17.8°. On the other hand, in the second embodiment, the vertical viewing angle was ±46.6° and greatly increased as compared to the comparative example. However, as can be seen from a portion CT of FIG. 11, a front crosstalk was generated in the second embodiment. However, the front crosstalk may be solved by adjusting the angle of the peak of the pattern groove.

A structure of the stereoscopic image display capable of reducing the crosstalk is described below.

Figure 12:
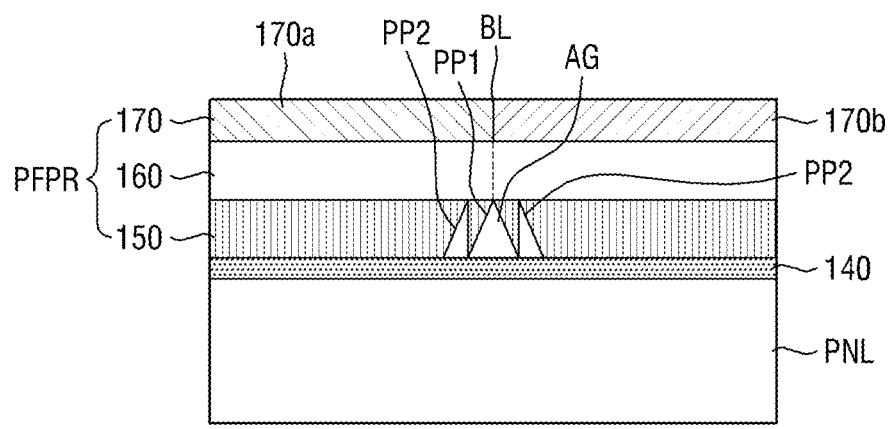
FIG. 12 is a cross-sectional view of a display panel and a 3D film according to a sixth embodiment of the invention.
Figure 13:
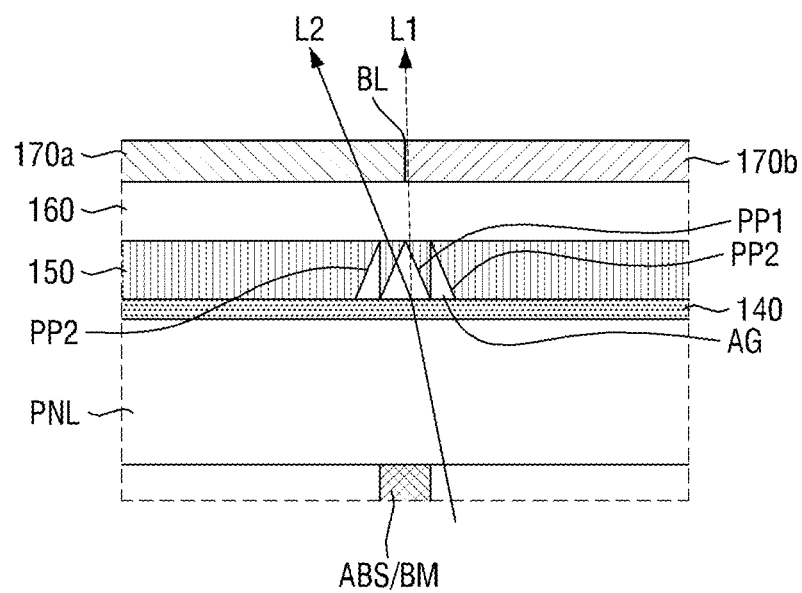
FIG. 13 illustrates a light path of a crosstalk passing through a pattern groove applied to the sixth embodiment of the invention.
Figure 14:
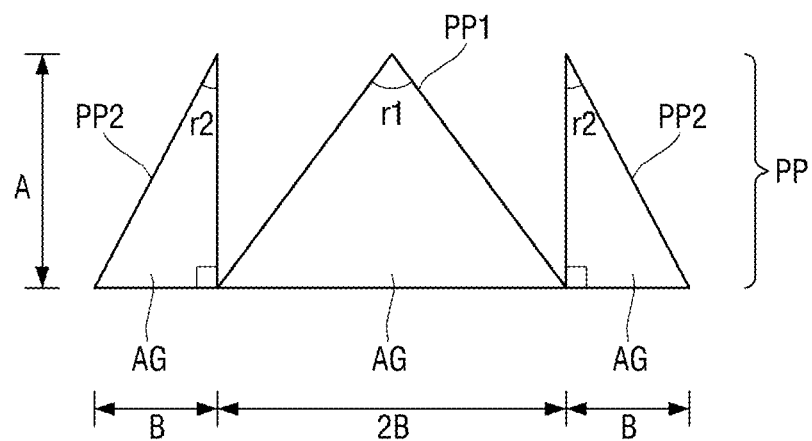
FIG. 14 illustrates a design value of the pattern groove applied to the sixth embodiment of the invention.
Figure 15:
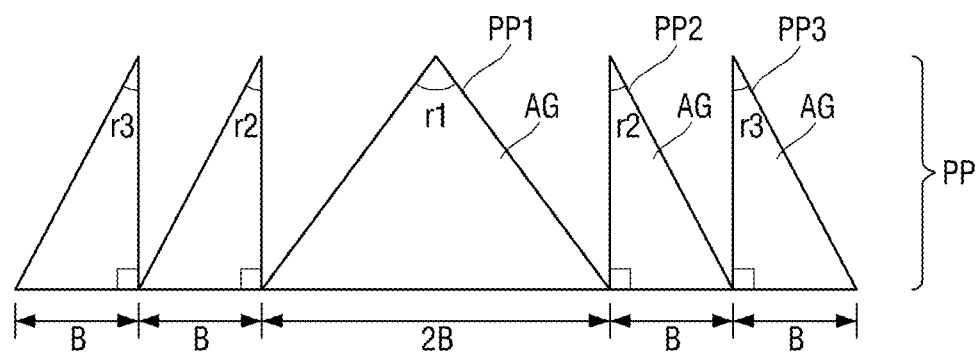
FIG. 15 illustrates a modified example of the pattern groove applied to the sixth embodiment of the invention.

FIG. 12 is a cross-sectional view of a display panel and a 3D film according to a sixth embodiment of the invention. FIG. 13 illustrates a light path of a crosstalk passing through a pattern groove applied to the sixth embodiment of the invention. FIG. 14 illustrates a design value of the pattern groove applied to the sixth embodiment of the invention. FIG. 15 illustrates a modified example of the pattern groove applied to the sixth embodiment of the invention.

A 3D film PFPR according to the sixth embodiment of the invention includes a pattern layer 150 having a first pattern groove PP1 positioned at a position corresponding to a pattern separator BL and a pair of second pattern grooves PP2 positioned on both sides of the first pattern groove PP1. Since other components included in the 3D film PFPR were described above, a further description may be briefly made or may be entirely omitted. The first and second pattern grooves PP1 and PP2 of the 3D film PFPR are described below.

As shown in FIG. 12, the first pattern groove PP1 has a triangular shape. The pair of second pattern grooves PP2 each have a right-angled triangle shape. In this instance, the two sides of each second pattern groove PP2 contacting the first pattern groove PP1 form a right angle. The first pattern groove PP1 corresponds to the active black stripe ABS or the black matrix BM formed on the display panel PNL. More specifically, it is preferable, but not required, that the center of the first pattern groove PP1 corresponds to the center of the active black stripe ABS or the black matrix BM. Although not shown, the second pattern grooves PP2 may correspond to the active black stripe ABS or the black matrix BM depending on the shape of the first pattern groove PP1.

When the 3D film PFPR does not include the first and second pattern grooves PP1 and PP2, light traveling in a direction L1 shown in FIG. 13 generates the crosstalk. However, as shown in FIG. 13, when the 3D film PFPR includes the first and second pattern grooves PP1 and PP2, light traveling in the direction L1 shown in FIG. 13 is refracted in a direction L2 shown in FIG. 13 and travels in another path. Namely, because light generating the crosstalk gets out of the pattern separator BL, the crosstalk is reduced and the vertical viewing angle is improved.

As shown in FIG. 14, the structures of the first and second pattern grooves PP1 and PP2 may vary depending on the structures of the subpixels, the active black stripe ABS or the black matrix BM, etc. constituting the display panel PNL. For example, a length 2B of the base of the first pattern groove PP1 and a length B of the base of the second pattern groove PP2 may vary depending on the structure of the display panel PNL. It is preferable, but not required, that the length 2B of the base of the first pattern groove PP1 is two times the length B of the base of the second pattern groove PP2. Further, an angle r1 of the peak of the first pattern groove PP1 and an angle r2 of the peak of the second pattern groove PP2 may vary depending on the structure of the display panel PNL.

As shown in FIG. 15, the pattern layer 150 may include a first pattern groove PP1 and two pairs of second pattern grooves PP2 and PP3 depending on the structures of the subpixels, the active black stripe ABS or the black matrix BM, etc. constituting the display panel PNL. In this instance, lengths B of the bases of the second pattern grooves PP2 and PP3 may be equal to or different from each other. Further, angles r2 of the peaks of the second pattern grooves PP2 and PP3 may be equal to or different from each other.

Figure 16:
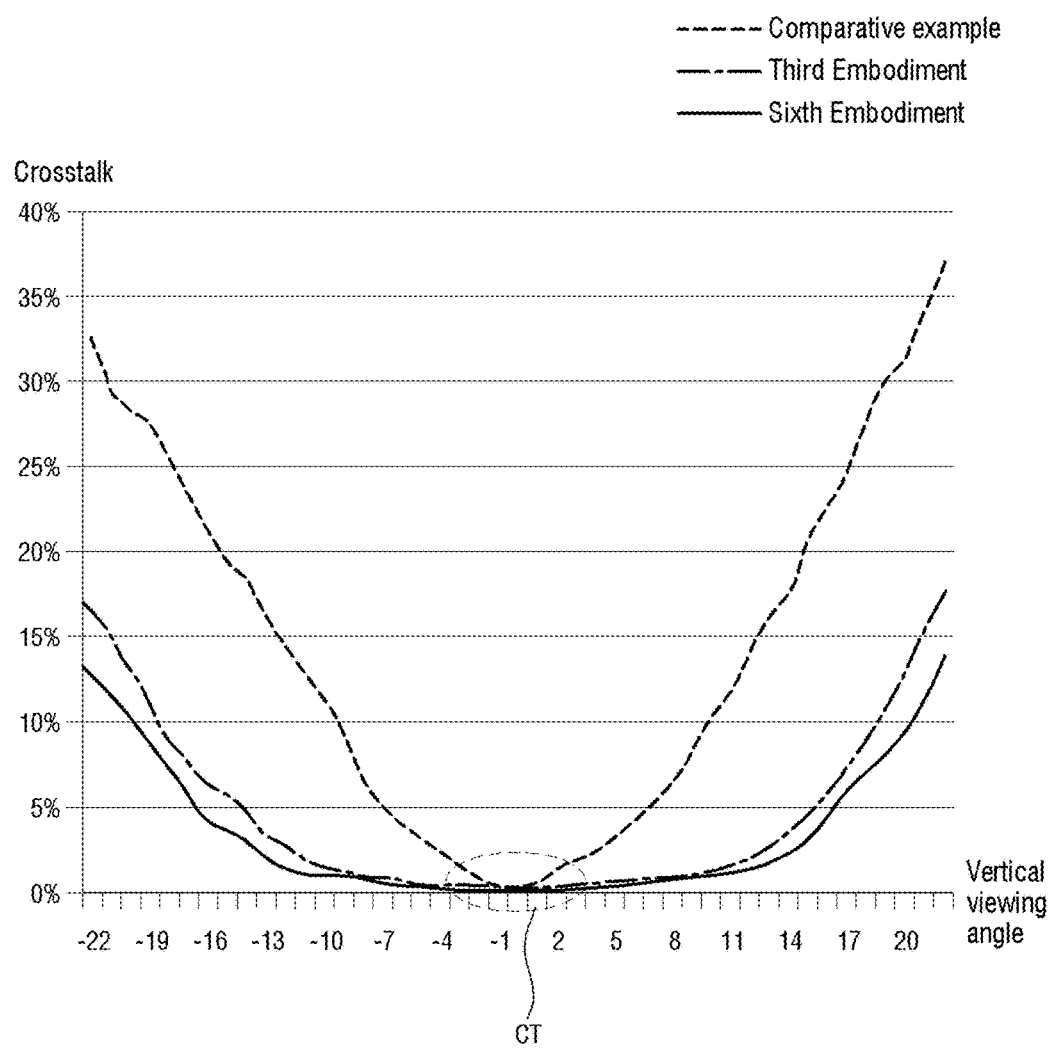
FIG. 16 is a simulation graph of the third and sixth embodiments of the invention and a comparative example.

FIG. 16 is a simulation graph of the third and sixth embodiments of the invention and a comparative example.

The comparative example of FIG. 16 has a structure in which a related art patterned retarder film is attached to a display panel having an active black stripe. The comparative example and the third and sixth embodiments of the invention used a 47-inch TV panel as the display panel. In the comparative example and the third and sixth embodiments, a 0.5T glass substrate was used as an upper substrate and a lower substrate of the display panel, and a polarizing plate attached to a display surface of the display panel had a thickness of about 180 μm. In the third embodiment of the invention, an angle of the peak of the pattern groove included in the 3D film was set to about 35°. In the sixth embodiment of the invention, an angle of the peak of the pattern groove included in the 3D film was set to about 38.6°.

In the comparative example, a vertical viewing angle was ±17.8°. On the other hand, the vertical viewing angle was ±35.6° in the third embodiment, and the vertical viewing angle was ±39.9° in the sixth embodiment. As can be seen from a portion CT of FIG. 16, a front crosstalk was not generated in the comparative example and the third and sixth embodiments.

As can be seen from the experiments, a reduction in the crosstalk and an increase in the vertical viewing angle may be achieved by properly modifying the structure of the pattern groove and the angle of the peak of the pattern groove depending on the structure of the display panel. Thus, those skilled in the art may manufacture the 3D film optimized depending on the structure of the display panel through the technical configuration and the repeated experiments of the embodiments of the invention. For example, the combination of the various structures of the pattern groove or an increase in the number of pattern grooves may be used to manufacture the optimum 3D film.

As described above, the embodiments of the invention may reduce the crosstalk and increase the vertical viewing angle using the 3D film having the pattern groove provided with the air layer. Further, the embodiments of the invention may simplify the manufacturing process of the stereoscopic image display and may improve the manufacturing yield using the 3D film, of which the components are configured in the form of the integral body.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for manufacturing a stereoscopic image display comprising:
    forming a display panel;
    forming a three-dimensional (3D) film including a patterned retarder film, a polarizing plate, and a pattern layer;
    positioning a mold having an embossment including a plurality of peaks and valleys on the pattern layer;
    closely positioning the mold on the pattern layer, so that the plurality of peaks and valleys are formed on the pattern layer in the form of an intaglio;
    removing the mold and forming an adhesive on the pattern layer so that the pattern layer has a pattern groove provided with an air layer inside the intaglio; and
    positioning the adhesive so that it is opposite to a display surface of the display panel, and attaching the 3D film to the display surface of the display panel,
    wherein the pattern groove includes a first pattern groove positioned at a position corresponding to a pattern separator for separating a first retarder pattern layer and a second retarder pattern layer of the patterned retarder film and at least one pair of second pattern grooves positioned on both sides of the first pattern groove,
    wherein the first pattern groove forms the air layer having an isosceles triangular shape, and
    wherein each of the second pattern grooves forms the air layer having a right-angled triangle shape including a right angle, and sides of each of the second pattern grooves that face the first pattern groove form the right angles.

2. The method of claim 1, wherein groove each of the first pattern groove and the second pattern grooves has a wide lower part contacting the display surface of the display panel and a narrow upper part contacting the polarizing plate.

3. The method of claim 1, wherein when the pattern layer is formed of a resin-based material, after the mold is closely positioned on the pattern layer, ultraviolet light is irradiated onto the mold to harden the pattern layer.

4. The method of claim 1, wherein a length of a side, contacting the display surface, of the first pattern groove is twice of a length of a side, contacting the display surface, of each of the second pattern grooves.

5. The method of claim 1, wherein the pattern groove includes the first pattern groove of the isosceles triangular shape and two or more pairs of the second pattern grooves of the right-angled triangle shape, and
    wherein a length of a side, contacting the display surface, of one of the second pattern grooves is the same as a length of a side, contacting the display surface, of another of the second pattern grooves.

6. The method of claim 5, wherein a length of a side, contacting the display surface, of the first pattern groove is twice of the length of the side of the second pattern grooves.

7. The method of claim 1, wherein the first pattern groove corresponds to an active black stripe or a black matrix formed on the display panel.

8. The method of claim 7, wherein a center of the first pattern groove corresponds to a center of the active black stripe or the black matrix.

* * * * *